(12) United States Patent
Zhang et al.

(10) Patent No.: US 8,015,790 B2
(45) Date of Patent: Sep. 13, 2011

(54) APPARATUS AND METHOD EMPLOYING HEAT PIPE FOR START-UP OF POWER PLANT

(75) Inventors: Hua Zhang, Greer, SC (US); Jatila Ranasinghe, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 530 days.

(21) Appl. No.: 12/181,689

(22) Filed: Jul. 29, 2008

(65) Prior Publication Data
US 2010/0025016 A1 Feb. 4, 2010

(51) Int. Cl.
*F02C 6/00* (2006.01)
*F01K 13/02* (2006.01)
(52) U.S. Cl. ............................ 60/39.182; 60/646; 60/657
(58) Field of Classification Search ................ 60/39.182, 60/645, 670, 646, 657; 165/106.25, 110, 165/272–274
See application file for complete search history.

(56) References Cited

U.S. PATENT DOCUMENTS

| | | | |
|---|---|---|---|
| 3,517,730 A | 6/1970 | Wyatt | |
| 3,722,797 A | 3/1973 | Hammill | |
| 3,852,805 A | 12/1974 | Brzozowski | |
| 4,033,406 A | 7/1977 | Basiulis | |
| 4,226,282 A * | 10/1980 | Kunsagi et al. | 165/104.14 |
| 4,234,782 A * | 11/1980 | Barabas et al. | 392/345 |
| 5,311,930 A * | 5/1994 | Bruenn | 165/102 |
| 5,918,555 A | 7/1999 | Winegar | |
| 6,132,823 A | 10/2000 | Qu | |
| 6,241,009 B1 | 6/2001 | Rush | |
| 6,397,575 B2 * | 6/2002 | Tomlinson et al. | 60/783 |
| 7,069,716 B1 | 7/2006 | Childers | |
| 7,382,047 B2 | 6/2008 | Chen et al. | |
| 2004/0045294 A1 | 3/2004 | Kobayashi et al. | |
| 2007/0017207 A1 | 1/2007 | Smith et al. | |
| 2007/0234704 A1 | 10/2007 | Moniz et al. | |
| 2008/0115923 A1 | 5/2008 | Yamanaka et al. | |

FOREIGN PATENT DOCUMENTS
EP 0 794 401 A2 9/1997
GB 2 099 126 A 12/1982

OTHER PUBLICATIONS

Hua Zhang; "Heat Pipe for Removing Thermal Energy Exhaust Gas"; filed Jul. 18, 2008 as U.S. Appl. No. 12/175,966.
Hua Zhang et al.; "System and Method for Managing Turbine Exhaust Gas Temperature"; filed Sep. 16, 2008 as U.S. Appl. No. 12/211,456.
Hua Zhang et al.; "Apparatus, System and Method for Heating Fuel Gas Using Gas Turbine Exhaust"; filed Jul. 29, 2008 as U.S. Appl. No. 12/181,715.
Hua Zhang et al.; "Combined Cycle Power Plant"; filed Oct. 17, 2008 as U.S. Appl. No. 12/253,435.
EP Search Report for Application No. EP 09 16 5813; Search Report dated Nov. 18, 2009.

* cited by examiner

Primary Examiner — Hoang M Nguyen
(74) Attorney, Agent, or Firm — Cantor Colburn LLP

(57) ABSTRACT

An apparatus to facilitate a start-up operation of a combined cycle or rankine cycle power plant is provided and includes a plurality of heat pipes, each of which respectively includes a first portion in thermal communication with exhaust emitted from a heat source and a second portion in thermal communication with the first portion, a cooling unit to cool the second portions of the heat pipes, and a controller which is configured to control the cooling unit to cool the second portions of the heat pipes and to thereby remove heat from exhaust via the first portions of the heat pipes.

18 Claims, 2 Drawing Sheets

GT Exhaust Conditions

# APPARATUS AND METHOD EMPLOYING HEAT PIPE FOR START-UP OF POWER PLANT

BACKGROUND

Aspects of the present invention are directed to an apparatus a system and a method employing a heat pipe to facilitate a fast start-up of a combined cycle or rankine cycle power plant.

During start-up operations for a combined cycle or a rankine cycle power plant, a heat recovery steam generator (HRSG) may experience thermal stress that limits a degree to which the start-up operations can be completed in a relatively short period of time.

Generally, in the start-up operations, various components of a power plant, such as the HRSG are subject to rapid temperature increases. Such temperature increases, if uncontrolled, can result in structural damage to the HRSG tubes and headers. To prevent this damage, a slowing of gas turbine start-up operations has been attempted but has associated costs in terms of lowered power production. In other cases, a use of a temperator for fluids inside the HRSG tubes and a designing of costly HRSG systems that can withstand high temperature ramp-up rates have also been proposed but are costly and difficult to achieve.

BRIEF DESCRIPTION

In accordance with an aspect of the invention, an apparatus to facilitate a start-up operation of a combined cycle or rankine cycle power plant is provided and includes a plurality of heat pipes, each of which respectively includes a first portion in thermal communication with exhaust emitted from a heat source and a second portion in thermal communication with the first portion, a cooling unit to cool the second portions of the heat pipes, and a controller which is configured to control the cooling unit to cool the second portions of the heat pipes and to thereby remove heat from exhaust via the first portions of the heat pipes.

In accordance with another aspect of the invention, a system to facilitate a start-up operation of a combined cycle or rankine cycle power plant is provided and includes a heat source to generate heat from which exhaust is output, a heat recovery steam generator (HRSG), fluidly coupled to the heat source, which is configured to receive a flow of the outputted exhaust, a plurality of heat pipes, each of which respectively includes a first portion that extends through the HRSG and a second portion integrally connected to the first portion that is removed from the HRSG, a gate disposed proximate to the second portions of the heat pipe to occupy and move between open and closed positions, a fan configured to rotate and to thereby generate a cooling air flow directed at and over the second portions of the heat pipes when the gate occupies the open position, and a controller, which is coupled to the fan and the gate and which is configured to open the gate and to drive the fan during the start-up operation to generate the cooling air flow to cool the heat pipes and to thereby remove heat from exhaust.

In accordance with another aspect of the invention, a method of controlling a combined cycle or rankine cycle power plant during a start-up operation thereof is provided and includes operating a heat source that outputs exhaust directed to flow over portions of heat pipes, opening a gate proximate other portions of the heat pipes, and operating a fan to generate a cooling air flow that passes over the other portions of the heat pipes and through the gate.

BRIEF DESCRIPTION OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION

The apparatus 1, which is described below, facilitates a fast start-up of a combined cycle or rankine cycle power plant with, e.g., a heat recovery steam generator (HRSG) 10.

Figure 1:
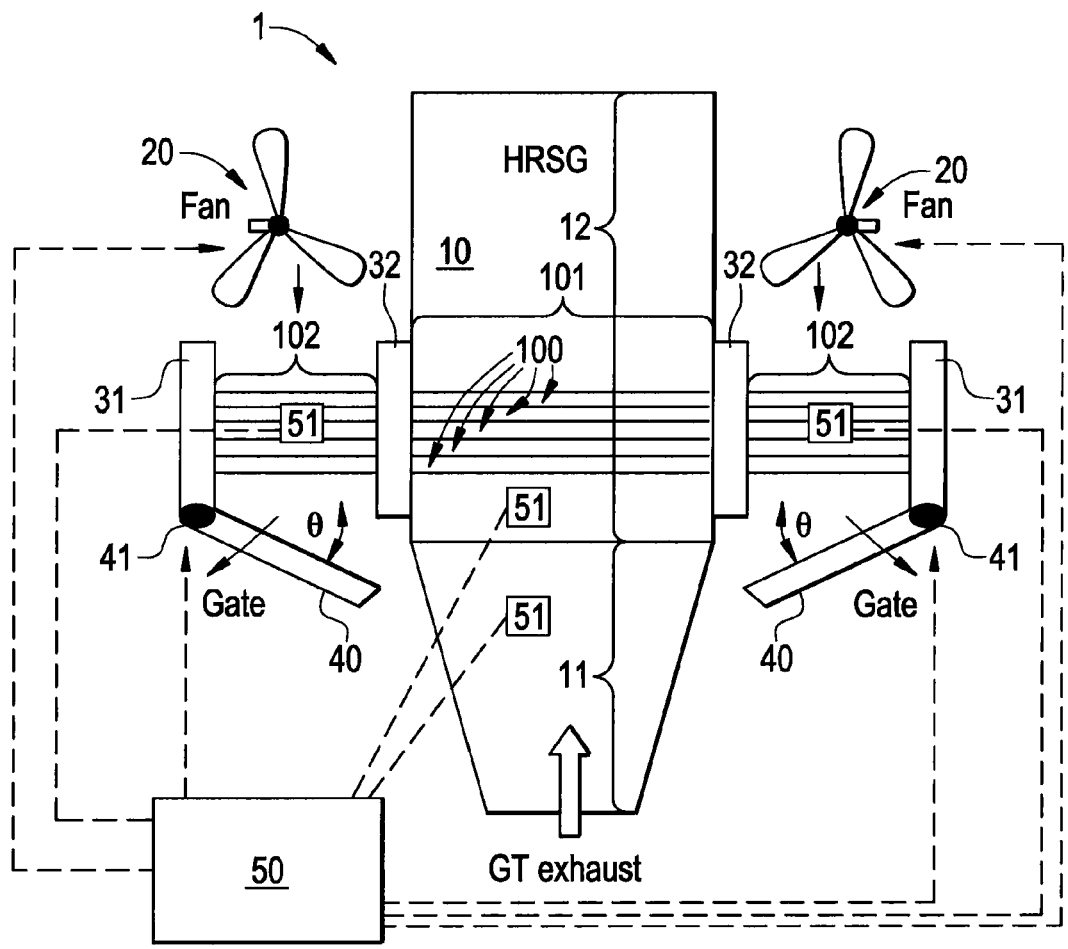
FIG. 1 is a schematic diagram of an exemplary apparatus to facilitate a start-up operation of a combined cycle or rankine cycle power plant.
Figure 2:
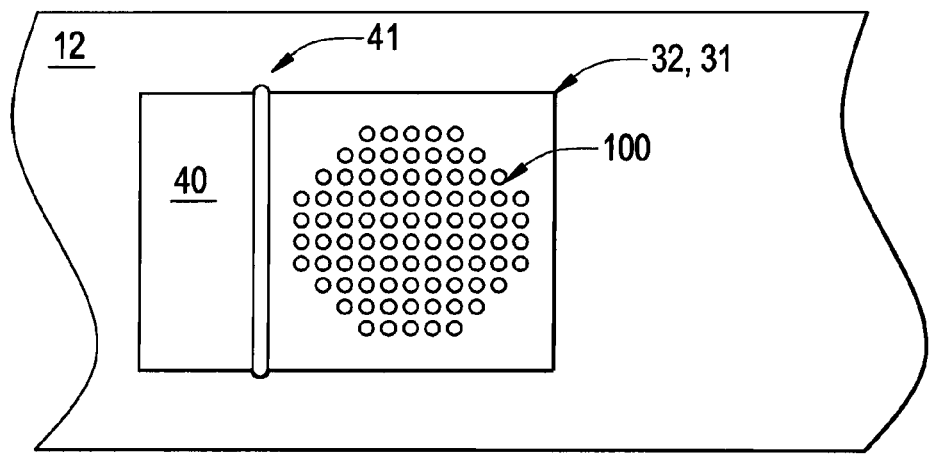
FIG. 2 is a cross-sectional view of a portion of the apparatus of FIG. 1.

With reference to FIGS. 1 and 2, the apparatus 1 includes a plurality of heat pipes 100. Each of the heat pipes 100 respectively includes a first portion 101 that is in thermal communication with a flow of exhaust emitted from a heat source. Each of the heat pipes 100 further includes a second portion 102. The second portion 102 of each heat pipe 100 is in thermal communication with the first portion 101 of the corresponding heat pipe 100 and may be removed from the flow of the exhaust such that the flow of the exhaust does not directly affect the second portions 102.

The flow of the exhaust is emitted from a heat source, such as a gas turbine, and the flow of the exhaust refers to exhaust gases emitted from the gas turbine (e.g., the GT exhaust, as shown in FIG. 1). Such a gas turbine would be coupled to an exhaust duct 10, such as a heat recovery steam generator (HRSG), including an inlet 11 and a main body 12. The inlet 11 is configured to fluidly receive the flow of the exhaust and is integrally connected to the main body 12. The first portions 101 of the heat pipes 100 extend through the main body 12 and, in this way, the flow of the exhaust, which is directed into the main body 12 of the exhaust duct 10, are therefore also directed to flow over the first portions 101 of the heat pipes 100.

A cooling unit, such as a fan 20 is configured to generate a cooling air flow directed at the second portions 102 of the heat pipes 100. A controller 50 is configured to drive the fan 20 during the start-up operation of the apparatus 1. The driving of the fan 20, therefore, generates the cooling air flow that cools the heat pipes 100 and, as a result, removes heat from the flow of the exhaust.

Here, it is noted that the cooling unit may include the fan 20 and/or other cooling devices. Such cooling devices could include, but are not limited to, heat sinks, refrigeration units, ambient air intake valves and/or any other suitable devices. Here, the various components may be employed separately or in combination with one another to achieve various types of cooling effects.

In accordance with various embodiments, the heat pipes 100 may include liquid heat pipes or solid state heat pipes. In liquid heat pipes, the pipe is sealed with working fluids or coolants such as, but not limited to, water, ethanol, acetone, sodium or mercury inside. When one portion of a liquid heat pipe is heated, some of the heat of the heat source is removed and transmitted to the fluids which then evaporate and condense at another portion of the liquid heat pipe. This process releases heat into a medium in thermal contact with that portion of the liquid heat pipe. As such, the cooler that medium is, the more heat is associatively removed from the heat source. Solid state heat pipes include vacuumed sealed tubes that are coated with Qu-material on an interior surface thereof. The Qu-material conducts heat and, as such, the solid state heat pipes operate in a similar fashion as the liquid heat pipes described above.

With particular reference to FIG. 2, which is not drawn to scale, it is noted that the heat pipes 100 may be arranged with respect to one another in various formations and configurations that promote thermal communication between exterior surfaces of the heat pipes 100 and the flow of the exhaust within the main body 12 of the exhaust duct 10 as well as the cooling air flow generated by the fan 20. These formations may include circular formations, as shown, or, alternately, rectangular formations. Within the formations themselves, the heat pipes 100 may be configured to be in-line with each other, as shown, or, alternately, to be staggered with respect to one another.

The apparatus 1 may further include at least one outer flange 31 and at least one inner flange 32 to support at least the second portions 102 of the heat pipes 100 in their respective positions. In an embodiment, the inner flange 32 may abut a side of the main body 12 of the exhaust duct 10 and the outer flange 31 may be separated from the side by a preselected distance. As such, the inner flange 32 and the outer flange 31 may serve as bookends for the second portions 102 of the heat pipes 100. In addition, the inner flange 32 and the outer flange 31 may also support the passage of fuel gas for use in the heat source over the second portions 102 of the heat pipes 100 during certain combined cycle operations of the apparatus 1.

The controller 50 is configured to transmit a control signal to drive the fan 20 to rotate and to thereby generate the cooling air flow directed over the second portions 102 of the heat pipes 100. In various embodiments, the controller 50 drives the fan 20 in accordance with certain preselected conditions. For example, the controller 50 can drive the fan 20 to rotate at various speeds in accordance with a completion degree of the start-up operation which is determined based on a timing of the start-up operation or a measured temperature of, e.g., the exhaust flow and/or the second portions 102 of the heat pipes 100. Here, a temperature measurement device 51, such as a thermocouple, may be coupled to the controller 50 and positioned within the inlet 11 or the main body 12 of the exhaust duct 10 or along the second portions 102 of the heat pipes 100. The controller 50 could then drive the fan 20 to rotate faster or slower so as to increase/decrease a cooling effect when the exhaust flow or the heat pipes 100, as measured by the thermocouple 51, are determined to be hotter/colder than preselected temperatures.

In a further embodiment, the controller 50 may cease the operation of the fan 20 when it is determined that the start-up operation is completed. Such a determination may be made when the apparatus 1 reaches thermal equilibrium. Here, exposed surfaces of the exhaust duct 10 reach a temperature which is substantially similar to that of the flow of the exhaust such that thermal stresses within the exhaust duct 10 are substantially reduced. At this time, the second portions 102 of the heat pipes 100 may be applied for use in, e.g., a fuel gas heating operation.

The apparatus 1 may further include a gate 40, which is coupled to one of the inner flange 32 or the outer flange 31 via a hinge 41 and to the controller 50. The controller 50 is configured to transmit a control signal to the gate 40 that drives the gate 40 to occupy and move between a closed position, at which the cooling air flow is blocked, and an open position, at which at least a portion of the cooling air flow generated by the fan 20 is permitted to flow over the second portions 102 of the heat pipes 100.

In an embodiment, the gate 40 occupies the open position at an initialization of the start-up operation of the apparatus 1 while the gate 40 may occupy the closed position upon a conclusion of the start-up operation. Further, it is understood that an orientation angle $\theta$ of the gate 40 in the open position may be varied by the controller 50 so as to allow for more/less of the cooling air flow to pass over the second portions 102 of the heat pipes 100. When the gate 40 occupies the closed position, the gate 40 may cooperate with the inner and outer flanges 32, 31 to provide for certain combined cycle operations of the apparatus 1. That is, the gate 40 may cooperate with the inner and outer flanges 32 to form a fuel gas passage whereby fuel gas for use in the heat source is heated by the heat pipes 100 prior to injection of the fuel gas into the heat source.

In further embodiments, it is also understood that the hinge 41 of the gate 40 may be disposed on either the inner flange 32 or the outer flange 31 or both. Where the hinge 41 is disposed on both the inner flange 32 and the outer flange 31, the gate 40 may be configured with multiple parts that open and close in opposite directions. In addition, as shown in FIG. 1, the second portions 102 of the heat pipes 100 may be disposed on either side of the exhaust duct 10. In this case, the fan 20, the outer flange 31, the inner flange 32, the gate 40 and the hinge 41 may be similarly disposed on either side of the exhaust duct 10.

In accordance with another aspect of the invention, a system to facilitate a start-up operation of a combined cycle or rankine cycle power plant is provided and includes a heat source (e.g., a gas turbine from which the GT exhaust of FIG. 1 is emitted) to generate heat from which an exhaust is output and an exhaust duct 10, such as a heat recovery steam generator (HRSG), fluidly coupled to the heat source, which is configured to receive a flow of the outputted exhaust gases. A plurality of heat pipes 100 each respectively includes a first portion 101 that extends through the exhaust duct 10 and a second portion 102 integrally connected to the first portion 101 that is removed from the exhaust duct 10. A gate 40 is disposed proximate to the second portions 102 of the heat pipe 100 to occupy and move between open and closed positions. A fan 20 is configured to rotate and to thereby generate a cooling air flow directed at and over the second portions 102 of the heat pipes 100 when the gate 40 occupies the open position. A controller 50 is coupled to the fan 20 and the gate 40 and is configured to open the gate 40 and to drive the fan 20 during the start-up operation. As discussed above, this generates the cooling air flow to cool the heat pipes 100 and to thereby remove heat from the flow of the exhaust.

In accordance with yet another aspect of the invention, a method of controlling a combined cycle or rankine cycle power plant during a start-up operation thereof is provided and includes operating a heat source (e.g., a gas turbine from which the GT exhaust of FIG. 1 is emitted) that outputs an exhaust that is directed to flow over portions of heat pipes 100, opening a gate 40 proximate other portions of the heat pipes 100, operating a fan 20 to generate a cooling air flow that passes over the other portions of the heat pipes 100 and through the gate 40. The method may further include continually operating the fan 20 until the start-up operation is completed, as discussed above. That is, while the fan 20 is operated, the method may include measuring a temperature of at least the exhaust and/or the heat pipes 100 and determining that the start-up operation is completed based on the measured temperature. Once the start-up operation is completed, the gate 40 is closed and the fan 20 is disabled.

Figure 3:
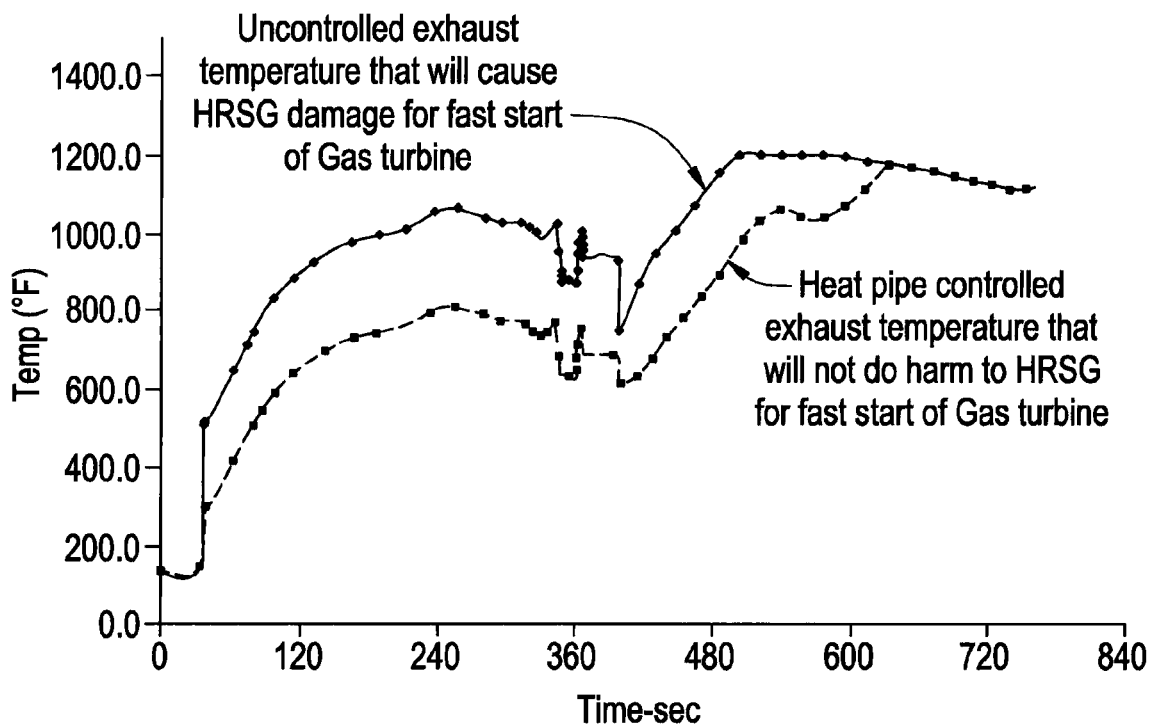
FIG. 3 is a graph showing data of exemplary uncontrolled gas turbine exhaust conditions and exemplary gas turbine exhaust conditions using heat pipe controls.

With reference to FIG. 3, in one particular operation of the apparatus 1, gas turbine exhaust that is cooled by the cooling air flow over the second portions 102 of the heat pipes 100 is maintained at a consistently lower temperature throughout a start-up operation as compared to uncontrolled gas turbine exhaust temperatures. In particular, at about 60 seconds following start-up, with the gate 40 opened and the fan 20 rotating, the temperature of the gas turbine exhaust is about 200° F. (93.3° C.) cooler than the gas turbine exhaust otherwise would be. As such, thermal stresses within the exhaust duct 10 may be substantially reduced. This temperature differential increases for about 200-300 second and then decreases until around 660 seconds after start-up, at which point, the use of the cooling air flow no longer has an appreciable effect (e.g., the apparatus 1 reaches equilibrium). At this time, the gate 40 is closed and the fan 20 is disabled to save energy.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

The invention claimed is:

1. An apparatus to facilitate a start-up operation of a combined cycle or rankine cycle power plant, the apparatus comprising:
   a plurality of heat pipes, each of which respectively includes a first portion in thermal communication with exhaust emitted from a heat source and a second portion in thermal communication with the first portion;
   a cooling unit to cool the second portions of the heat pipes; and
   a controller which is configured to control the cooling unit to cool the second portions of the heat pipes and to thereby remove heat from exhaust via the first portions of the heat pipes in accordance with a degree of completion of the start-up operation.

2. The apparatus according to claim 1, wherein the plurality of the heat pipes comprise liquid heat pipes.

3. The apparatus according to claim 1, wherein the plurality of the heat pipes comprise solid state heat pipes.

4. The apparatus according to claim 1, wherein the heat source comprises a gas turbine and the exhaust comprises exhaust gas emitted by the gas turbine.

5. The apparatus according to claim 4, further comprising a heat recovery steam generator (HRSG) coupled to the gas turbine, through which the exhaust gas flows.

6. The apparatus according to claim 5, wherein the first portions of the heat pipes extend through the HRSG.

7. The apparatus according to claim 1, wherein the cooling unit comprises a fan configured to generate a cooling air flow directed at the second portions of the heat pipes.

8. The apparatus according to claim 7, wherein the controller drives the fan to rotate at various speeds in accordance with a completion degree of the start-up operation.

9. The apparatus according to claim 7, wherein the controller drives the fan to rotate at various speed in accordance with a temperature of the exhaust.

10. The apparatus according to claim 7, wherein the controller ceases a driving of the fan upon a conclusion of the start-up operation.

11. The apparatus according to claim 1, further comprising a gate coupled to the controller, which is configured to receive a control signal from the controller and to accordingly occupy and move between:
   a closed position, at which the cooling air flow is blocked, and
   an open position, at which at least a portion of the cooling air flow is permitted to flow over the second portions of the heat pipes.

12. The apparatus according to claim 11, wherein the gate occupies the open position at an initialization of the start-up operation and the closed position upon a conclusion of the start-up operation.

13. The apparatus according to claim 11, wherein an orientation angle of the gate in the open position is varied by the controller.

14. A system to facilitate a start-up operation of a combined cycle or rankine cycle power plant, comprising:
   a heat source to generate heat from which exhaust is output;
   a heat recovery steam generator (HRSG), fluidly coupled to the heat source, which is configured to receive a flow of the outputted exhaust;
   a plurality of heat pipes, each of which respectively includes a first portion that extends through the HRSG and a second portion in thermal communication with the first portion that is removed from the HRSG;
   a gate disposed proximate to the second portions of the heat pipe to occupy and move between open and closed positions;
   a fan configured to rotate and to thereby generate a cooling air flow directed at and over the second portions of the heat pipes when the gate occupies the open position; and
   a controller, which is coupled to the fan and the gate and which is configured to open the gate and to drive the fan during the start-up operation to generate the cooling air flow to cool the heat pipes and to thereby remove heat from exhaust in accordance with a degree of completion of the start-up operation.

15. A method of controlling a combined cycle or rankine cycle power plant during a start-up operation thereof, the method comprising:
   operating a heat source that outputs exhaust directed to flow over portions of heat pipes;
   opening a gate proximate other portions of the heat pipes; and
   operating a fan to generate a cooling air flow that passes over the other portions of the heat pipes and through the gate in accordance with a degree of completion of the start-up operation.

16. The method according to claim 15, further comprising continually operating the fan until the start-up operation is completed.

17. The method according to claim 16, further comprising:
   measuring a temperature of at least the exhaust; and
   determining that the start-up operation is completed based on the measured temperature.

18. The method according to claim 16, further comprising:
   closing the gate; and
   disabling the fan when the start-up operation is completed.

* * * * *